(12) United States Patent (10) Patent No.: US 12,675,483 B1
Myers et al. (45) Date of Patent: Jul. 7, 2026

(54) GRAPH-BASED TECHNIQUES FOR DETECTING AND STORING DATA SET DEPENDENCIES

(71) Applicant: State Farm Mutual Automobile Insurance Company, Bloomington, IL (US)

(72) Inventors: Michael Myers, Heyworth, IL (US); Karen Hill, Bloomington, IL (US); Lisa Clawson, Bloomington, IL (US); Alesha Roy, Mackinaw, IL (US); Hao Ngu, Chandler, AZ (US); Brian N. Harvey, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 103 days.

(21) Appl. No.: 18/475,990

(22) Filed: Sep. 27, 2023

(51) Int. Cl.
  *G06F 16/245* (2019.01)
  *G06F 16/22* (2019.01)
  *G06F 16/2455* (2019.01)
(52) U.S. Cl.
  CPC ...... *G06F 16/2455* (2019.01); *G06F 16/2228* (2019.01)
(58) Field of Classification Search
  None
  See application file for complete search history.

(56) References Cited

U.S. PATENT DOCUMENTS

| 8,229,775 | B2 | 7/2012 | Adler et al. | |
| 9,996,595 | B2 | 6/2018 | Bond | |
| 10,297,053 | B1 * | 5/2019 | Zitzelsberger | ............ G06T 1/20 |
| 11,372,854 | B2 | 6/2022 | Friedman et al. | |
| 2009/0083313 | A1 * | 3/2009 | Stanfill | ................. G06F 9/4494 |
| | | | | 707/999.102 |
| 2013/0318540 | A1 * | 11/2013 | Kumura | ................ G06F 15/825 |
| | | | | 718/106 |

(Continued)

FOREIGN PATENT DOCUMENTS

| JP | 2017-502391 A | * | 1/2017 |

OTHER PUBLICATIONS

Parallelization of Shortest Path Algorithm Using OpenMP and MPI, Awari et al (Year: 2017).*

(Continued)

*Primary Examiner* — Augustine K. Obisesan
(74) *Attorney, Agent, or Firm* — Lee & Hayes, P.C.

(57) ABSTRACT

The disclosure describes a method for optimizing data flow graphs to represent relationships between data sets. In an example implementation, a processor receives an initial graph showing direct links between data sets and elements. The processor then expands this graph by replacing direct source-target links with new paths going through intermediate elements. Next, the processor simplifies the expanded graph by removing intermediary nodes and edges, replacing them with direct source-target links. If the graph shows an indirect path between two data sets through intermediate nodes, the path will be consolidated into a single direct link. Additionally, the optimized graph is persisted in a database and made accessible through queries. Overall, this improves lineage graph efficiency, allowing easier traversal and analysis, while also enabling incremental updates as data flows change.

20 Claims, 7 Drawing Sheets

(56) References Cited

U.S. PATENT DOCUMENTS

| | | | | |
|---|---|---|---|---|
| 2014/0033173 | A1* | 1/2014 | Frenkiel | G06F 8/74 |
| | | | | 717/123 |
| 2017/0177740 | A1* | 6/2017 | Abaya | G06F 16/22 |
| 2019/0370407 | A1* | 12/2019 | Dickie | G06F 16/9024 |
| 2021/0208999 | A1* | 7/2021 | Rozenberg | G06F 8/34 |
| 2021/0216290 | A1* | 7/2021 | Bach | G06F 8/71 |
| 2021/0232579 | A1* | 7/2021 | Schechter | G06F 9/5061 |
| 2022/0004577 | A1 | 1/2022 | Falco et al. | |
| 2022/0309103 | A1* | 9/2022 | Armbrust | G06F 16/254 |
| 2022/0309104 | A1* | 9/2022 | Armbrust | G06F 16/215 |

OTHER PUBLICATIONS

Acar et al., "A graph model of data and workflow provenance," Proceedings of the 2nd conference on Theory and practice of provenance, Feb. 2010, 10 pages.

Wikipedia, "Floyd-Warshall alsgorithm," downloaded from https://en.wikipedia.org/wiki/Floyd%E2%80%93Warshall_algorithm on Sep. 27, 2023, 7 pages.

* cited by examiner

300

RECEIVE EXPANDED GRAPH
302

PERFORM BREADTH-FIRST
SEARCH
304

INDIRECT PATHS?
306

YES

PERFORM GRAPH SIMPLIFICATION
310

NO

STORE GRAPH PERSISTENTLY
308

400

402

404

410

402

412

414

420

422

500

```
FUNCTION ADD(X, Y) {

// RETURNS THE SUM OF X AND Y.
    RETURN X + Y
}

Z = ADD(X, Y)
```

```
FUNCTION GETWEIGHTINGFACTOR() {

// RETURNS A CONSTANT VALUE.
    RETURN 3.14
}

W = GETWEIGHTINGFACTOR()
Z = X × W
```

```
FUNCTION WRITETOLOGFILE(DATA) {

// WRITES INFORMATION TO A LOG FILE.
    SYSTEM.LOG.WRITE(DATA)
}

WRITETOLOGFILE("LOREM IPSUM.")
```

FIG. 5C

GRAPH-BASED TECHNIQUES FOR DETECTING AND STORING DATA SET DEPENDENCIES

TECHNICAL FIELD

The present disclosure relates to data governance solutions, and more particularly to techniques for detecting and storing data set dependencies in an optimized and efficient manner.

BACKGROUND

Detecting and storing data set dependencies is critical for many data management tasks, including impact analysis, data governance, and compliance assurance tasks. However, existing systems for representing data set dependencies suffer from several shortcomings. For example, many existing systems lack an automated way to collect timely, comprehensive metadata about data processing operations. Additionally, many existing systems do not enable persistent storage of historical dependency data in an optimized way. Furthermore, accessing dependency data from many existing systems requires specialized expertise and complex custom programming. This hampers widespread adoption across users and applications.

Examples of the techniques described in the present disclosure are directed to overcoming the deficiencies noted above.

SUMMARY

In some examples, the techniques described herein relate to a computer-implemented method, including receiving, by a processor, a first data flow graph that represents: a first direct relationship between a first data set and a first data element of the first data set, and a second direct relationship between the first data element and a second data set. The method further includes determining, by the processor, a second data flow graph by modifying the first data flow graph to replace the second direct relationship with: a third direct relationship between the first data element and a second data element of the second data set that is determined based on the first data element, and a fourth direct relationship between the second data element and the second data set. The method further includes determining, by the processor, that the second data flow graph represents a first indirect relationship between the first data set and the second data set. The method further includes determining, by the processor, and in response to determining that the second data flow graph represents the first indirect relationship between the first data set and the second data set, a third data flow graph by modifying the second data flow graph to replace the first direct relationship, the third direct relationship, and the fourth direct relationship with a fifth direct relationship between the first data set and the second data set. The method further includes storing, by the processor, the third data flow graph in a database, wherein the third data flow graph is accessible in the database via a database query.

In additional examples, the techniques described herein relate to a computing system, including: a processor; and memory storing computer-executable instructions that, when executed by the processor, cause the computing system to perform operations including receiving, by a processor, a first data flow graph that represents: a first direct relationship between a first data set and a first data element of the first data set, and a second direct relationship between the first data element and a second data set. The operations further include determining, by the processor, a second data flow graph by modifying the first data flow graph to replace the second direct relationship with: a third direct relationship between the first data element and a second data element of the second data set that is determined based on the first data element, and a fourth direct relationship between the second data element and the second data set. The operations further include determining, by the processor, that the second data flow graph represents a first indirect relationship between the first data set and the second data set. The operations further include determining, by the processor, and in response to determining that the second data flow graph represents the first indirect relationship between the first data set and the second data set, a third data flow graph by modifying the second data flow graph to replace the first direct relationship, the third direct relationship, and the fourth direct relationship with a fifth direct relationship between the first data set and the second data set. The operations further include storing, by the processor, the third data flow graph in a database, wherein the third data flow graph is accessible in the database via a database query.

In further examples, the techniques described herein relate to one or more non-transitory computer-readable media storing computer-executable instructions that, when executed by the processor, cause the one or more processors to perform operations, including receiving, by a processor, a first data flow graph that represents: a first direct relationship between a first data set and a first data element of the first data set, and a second direct relationship between the first data element and a second data set. The operations further include determining, by the processor, a second data flow graph by modifying the first data flow graph to replace the second direct relationship with: a third direct relationship between the first data element and a second data element of the second data set that is determined based on the first data element, and a fourth direct relationship between the second data element and the second data set. The operations further include determining, by the processor, that the second data flow graph represents a first indirect relationship between the first data set and the second data set. The operations further include determining, by the processor, and in response to determining that the second data flow graph represents the first indirect relationship between the first data set and the second data set, a third data flow graph by modifying the second data flow graph to replace the first direct relationship, the third direct relationship, and the fourth direct relationship with a fifth direct relationship between the first data set and the second data set. The operations further include storing, by the processor, the third data flow graph in a database, wherein the third data flow graph is accessible in the database via a database query.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5A provides an operational example of a data processing function that receives values from two data sets X and Y as inputs and stores the resulting summation values in a data set Z.

FIG. 5B provides an operational of a data processing function that processes values from a data set X and stores the product of those values with a constant value in a data set Z.

FIG. 5C provides an operational example of a data processing function that stores an input parameter received by a function call in a file.

DETAILED DESCRIPTION

The disclosure describes a system for collecting metadata about data processing operations, using the metadata to generate lineage graphs modeling relationships between data sets and elements, optimizing these graphs, persisting them in a database, and enabling access to the stored graphs. The system extracts metadata from data processing applications to understand connections between source and target data. The system may generate graphs with nodes for data sets and data elements and edges for relationships between data sets and data elements. The system may perform graph expansion operations to convert implicit relationships between data sets and data elements and implicit relationships between pairs of data elements into explicitly represented edges. The system may perform graph reduction operation to replace intermediary links between indirectly connected data sets with direct edges. After performing at least one of the graph expansion operations or the graph reduction operations, the system may store the resulting optimized graph in a database so the graph can be incrementally updated and queried through a lineage API to retrieve data set and data element mappings and dependencies without regeneration each time. Overall, this improves efficiency, persistency, and accessibility of data lineage information across systems. In some cases, the techniques described herein reduce complexity of data flow graph to enable users to make use of the data included in those graph (e.g., to determine where data comes from, what processes produced such data, where data is going, what are impacts of changes in data and/or processes, what data sources and data elements were used to derive the data, how have data and processes changed over time, what connections exist between data elements and processes, and/or the like). Moreover, the techniques described herein may fix missing relationships that have not been reflected in data flow graph due to limitations of processes used to generate such graphs.

Figure 1:
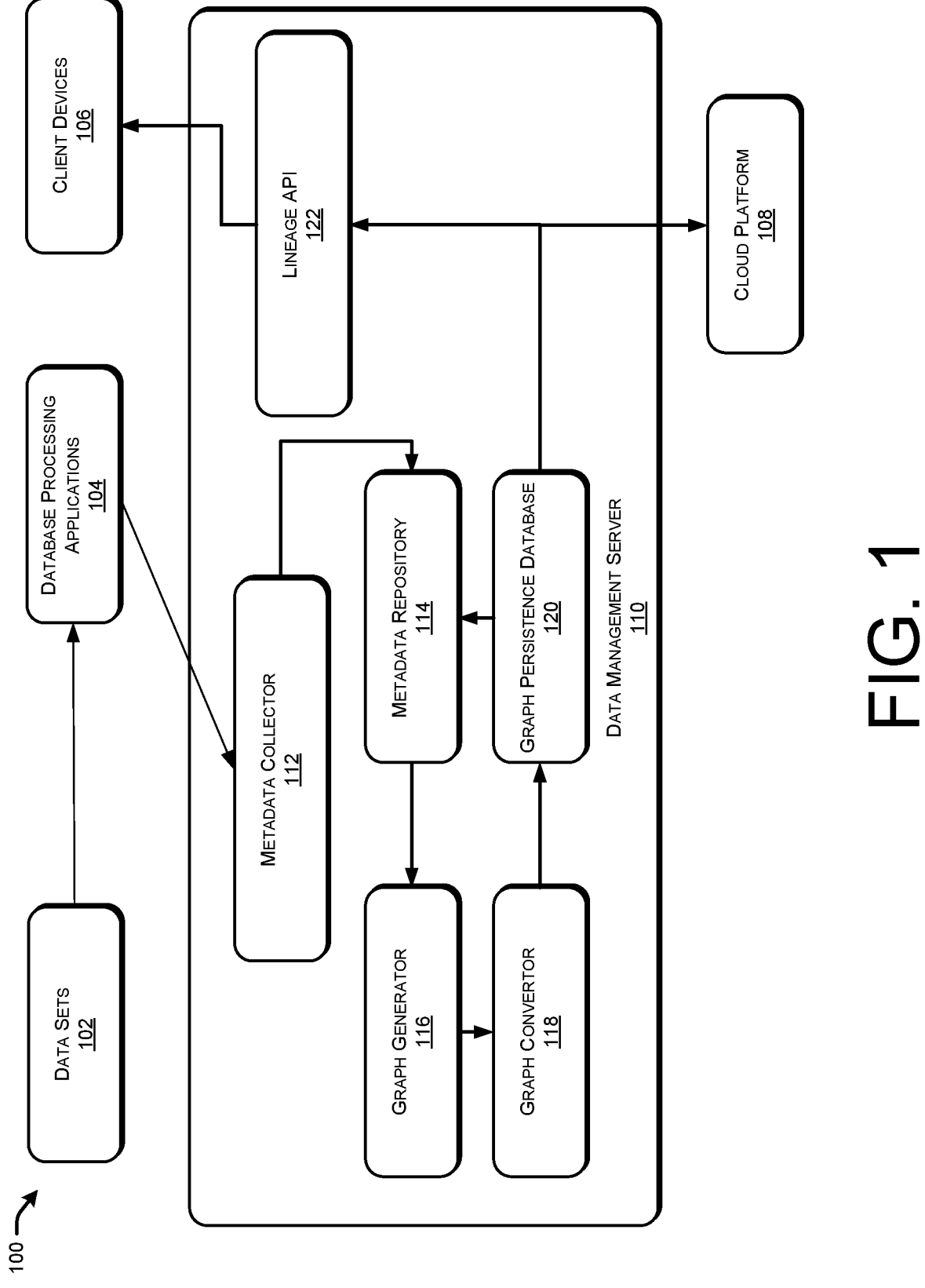
FIG. 1 illustrates an example environment for collecting metadata from data security applications and generating data flow graphs.

FIG. 1 illustrates an example environment 100 for collecting metadata and generating data flow graphs representing data dependency and/or data lineage information. The environment 100 includes a set of data sets 102 that are monitored and processed by a set of data processing applications 104. The data processing applications 104 may include various types of applications that transform, copy, or otherwise process the data in the data sets 102, such as database servers, application programming interfaces (APIs), extract-transformed-load (ETL) tools, etc.

The data sets 102 may include structured and unstructured data databases. Examples of such databases include relational databases, NoSQL databases, file shares, S3 buckets, etc. The data sets 102 are the inputs and outputs for the data processing applications 104. They may contain data elements that are copied, transformed, and moved between data sets by the data processing applications 104.

The data processing applications 104 represent the various systems and pipelines that operate on the data sets 102. Examples of data processing applications 104 include: (i) ETL tools like Informatica, Talend, etc. that extract data from sources, transform it, and load into targets, (ii) streaming platforms like Kafka, Kinesis, etc. that route messages between data sets 102, (iii) machine learning (ML) training pipelines that read data for model training, (iv) database replication tools that synchronize data between repositories, (v) data integration modules that move data around, and (vi) database management routines executed by a database management system.

In some examples, the data processing applications 104 execute metadata collection agents that track data lineage information as operations occur. For example, in some cases, APIs and software development kits (SDKs) transmit metadata from the data processing applications 104 and transmit such metadata to the metadata collector 112.

The environment 100 also includes a data management server 110 that collects metadata about the operations performed by the data processing applications 104 on the data sets 102. The data management server 110 includes a metadata collector 112 that monitors the data processing applications 104 and extracts metadata describing the data transformations, data flows, and relationships between data elements. The extracted metadata is stored in a metadata repository 114.

The metadata collector 112 may monitor the data processing applications 104 to extract metadata from those data processing applications 104. The metadata may include information about source data sets, target data sets, data transformations, relationships between data elements, and functions that operate on all or part of source data sets to generate all or part of target data sets.

After extracting metadata from the data processing applications 104, the metadata collector 112 may store the extracted metadata in the metadata repository 114. In some examples, the metadata collector 112 receives data generated by metadata collection agents executed by the data processing applications 104. The metadata collector 112 may receive the metadata transmitted by the data processing applications 104, aggregate the metadata, validate the aggregated metadata, and handle ingestion errors and duplicates in the aggregated metadata. In some examples, the metadata collector 112 cleanses and standardizes the raw metadata before storing such data onto the metadata repository 114. The metadata stored on the metadata repository 114 may include data fields corresponding to data set and element identifiers, timestamps, data set relationships, and data element mappings for each operation performed by the data processing applications 104.

The metadata repository 114 stores the metadata ingested by the metadata collector 112. The metadata repository 114 may provide query capabilities for the graph generator 116 to easily retrieve the stored metadata. The metadata repository 114 may include relational or NoSQL databases, graph persistence databases, etc. The metadata repository 114 may persist metadata for historical analysis. This persistent storage may enable the data flow graphs to show how data has moved over time and enable the graph generator 116 to incrementally create new graphs or update existing ones.

The graph generator 116 may extract metadata stored in the metadata repository 114 to generate a data flow graph that represents relationships between data sets 102, relationships between data sets 102 and data elements of those data sets 102, and/or relationships between data elements. In some examples, the graph generator 116 uses the metadata from the metadata repository 114 to generate a data flow graph showing relationships between data sets 102, between data sets 102 and their constituent data elements, and between data elements themselves.

For example, a data flow graph may represent that a software application (e.g., a data processing application 104) has copied and/or modified data in a source data set 102 to generate data in a target data set. In some examples, the data flow graph may represent direct relationships (e.g., direct edges) between data sets and data elements. In some cases, a node of a data flow graph corresponds to data sets and/or data elements, while edges represent relationships between data sets, between data elements, and/or between data sets and data elements.

For example, if a data graph represents that a software application (e.g., a data processing application 104) has copied and/or modified data associated with a source data element in a source data set 102 to generate data in a target data set, the resulting data flow graph may include a direct relationship (e.g., a direct edge) between the source data set and the source data element and a direct relationship (e.g., a direct edge) between the source data element and the target data set.

The graph generator 116 may generate a data flow graph using the metadata stored in the metadata repository 114. To generate the data flow graph, the graph generator 116 may model data sets as nodes and relationships between data sets as edges. This resulting data flow graph may be a visual model showing how data moves between data sets. The graph generator 116 can generate data flow graphs for different periods of time, filters, and other parameters based on the metadata repository contents. Data flow graphs may show historical data flows or represent near real-time operations.

After the graph generator 116 generates a data flow graph, the graph converter 118 converts the data flow graph into a transformed data flow graph. The graph converter 118 may transform the data flow graph by expanding it to show all element-to-element relationships and/or simplifying the data flow graph by removing intermediary nodes and edges and creating direct relationships between indirectly connected nodes.

In some examples, the graph converter 118 optimizes the data flow graphs created by the graph generator 116 using expansion and reduction techniques. Graph expansion may convert implicit relationships into explicit ones by connecting data elements to their parent data sets. This conversion provides a granular mapping of which source elements feed into which target elements. Graph reduction may simplify data flow graphs removing intermediary nodes and edges and connecting distant nodes directly when possible. This simplification condenses complex graphs down to their most critical essence.

In some examples, generating the transformed data flow graph includes at least one of a graph expansion operation and a graph simplification operation. The graph expansion operation may include expanding a data flow graph to indicate all relationships between data elements and between data elements and data sets.

For example, if data flow graph includes a first direct relationship between a source data set and a source data element of the source data set and a second direct relationship between the source data element and a target data set whose data is determined based on the source data set, then the graph expansion operation may include generating a data flow graph that includes: (i) a third direct relationship between a target data element of the target data set that is determined based on the source data element, and (ii) a fourth data relationship between the target data element and the target data set. In some examples, the graph generator 116 may replace the second direct relationship with the third and fourth direct relationships. Accordingly, the expanded data flow graph may include: (i) the first direct relationship between the source data set and the source data element that represents that the source data element belongs to the source data set, (ii) the third direct relationship that represents that the target data element is determined based on the source data element, and (iii) the fourth direct relationship that represents that the target data element belongs to the target data set.

The graph reduction operation performed by the graph converter 118 may include determining all pairs of data sets whose respective nodes are indirectly connected (e.g., connected via a set of intermediate nodes), creating a direct relationships between each pair of indirectly connected data sets, and removing all other direct relationships that indirectly connect the nodes associated with the pair.

For example, if a data flow graph (e.g., an expanded data flow graph) includes a first direct relationship between a source data set and a source data element, a second direct relationship between the source data element and a target data element, and a third direct relationship between the target data element and a target data set, then the graph reduction operation may include generating a data flow graph that replaces all of those direct relationships with a direct relationship (e.g., a direct edge) between the source data set and the target data set.

As another example, if a data flow graph (e.g., an expanded data flow graph) includes a first direct relationship between a source data set and a first source data element, a second direct relationship between a source data set and a second source data element, a third direct relationship between the first source data element and a first target data element, a fourth direct relationship between the second source data element and a second target data element, a fifth direct relationship between the first target data element and a target data set, and a sixth direct relationship between the second target data element and a target data set, then the graph reduction operation may include generating a data flow graph that replaces all of those direct relationships with a direct relationship (e.g., a direct edge) between the source data set and the target data set.

In some cases, the graph converter 118 performs one or more graph correction operations on the expanded data flow graph and/or the transformed data flow graph. To do so, the graph converter 118 may correct errors and/or omissions in the data flow graphs by determining relationships between data elements and generating relationships corresponding to those missing relationships. For example, the graph converter 118 may determine that a data element without an outgoing relationship (aka. a "leaf" element) and a data element without an incoming relationship (aka. a "root" element) are related (e.g., that the leaf element is determined based on the node element) and generate a relationship from the leaf element to the root element. Determining the relationship may be based on the data types of the two elements and/or the extract, transform, and load (ETL) processes used to extract the two elements. In some cases, particular ETL processes frequently lead to missing data relationships and thus missing relationships can be identified based on ETL processes used to extract data elements.

In some examples, the graph converter may identify a "leaf" data element node that has no outgoing relationships to other elements as well as a "root" data element node that has no incoming relationships from other elements. By analyzing the data types and/or associated ETL processes of the leaf and root nodes, the graph converter 118 may determine if an implied relationship exists and add a corresponding edge between the elements. Common cases where these missing relationships exist may relate to ETL jobs that use pivot or join operations.

For example, the graph converter 118 may detect a leaf node representing an account identifier data element and a root node representing a customer name data element. Based on the data types of these two nodes, the graph converter 118 may infer that the account identifier is likely used to look up the customer name and thus the two nodes are related. Accordingly, the graph converter 118 may generate an edge connecting the account identifier node to the customer name node to represent this missing linkage.

As another example, the graph converter 118 may detect a leaf node for a customer address data element and a root node for a sales order data element. Based on the understanding that certain ETL jobs commonly join customer and order data, the graph converter 118 may determine that a relationship likely exists between the two nodes. Accordingly, the graph converter 118 may generate an edge connecting the customer address data element to the sales order data element.

In some cases, the operations described above for determining missing relationships between data elements and generating corresponding relationships may be performed by the graph generator 116 on the data flow graph generated by that component and before providing the data flow graph to the graph converter 118. For example, the graph generator 116 may apply a process to detect leaf and root data element nodes and infer implied relationships between them based on data types, ETL processes, and/or other attributes. The graph generator 116 may then add edges for these missing linkages directly into the initial data flow graph. This approach may enable the graph converter 118 to receive an enhanced graph as input for further optimization and transformation. In some cases, the operations described above for determining missing relationships between data elements and generating corresponding relationships may be performed by the graph converter 118 on the expanded data graph before the expanded data graph is used to generate the transformed data graph. In some cases, the operations described above for determining missing relationships between data elements and generating corresponding relationships may be performed by the graph converter 118 on the transformed data graph before the transformed data graph is stored on the graph persistence database 120.

After a reduced graph is generated, the graph may be simplified by the graph converter 118 to generate the transformed graph. To simplify the reduced graph, the graph converter 118 may identify all nodes corresponding to source and target data sets. For each node pair including a first node corresponding to a source data set and a second node corresponding to a target data set, the graph converter 118 may use a graph traversal algorithm to determine if a directed path exist from the first to the second node. If so, the graph converter 118 may create a directed edge from the first node and the second node.

After the graph converter 118 generates the transformed data flow graph, the graph persistence database 120 stores the transformed data flow graph. The graph persistence database 120 allows client devices and/or users to quickly query and analyze data flow graphs without regeneration. The graph persistence database 120 may also store graphs efficiently for retrieval at different granularity levels. The graph persistence database 120 may store the transformed data flow graph using a predefined data model, such as a relational data model and/or a graph-based data model. In some examples, the graph persistence database 120 stores graphs using efficient data structures optimized for graph traversal and analysis algorithms. Example graph persistence database technologies include Neo4j, Amazon Neptune, etc.

A lineage API 122 provides access to query the graph persistence database 120 to determine data set relationships and element-to-element mappings. The lineage API 122 can provide this lineage information via a cloud platform 108 or directly to client devices 106. In some examples, the lineage API 122 provides programmatic access to query and retrieve optimized data flow graphs from the graph persistence database 120. Accordingly, the lineage API 122 may enable users and/or client devices to obtain data set and data element mappings across systems.

In some examples, the lineage API 122 returns lineage information such as: (i) the source data sets and elements for a given target data set/element, (ii) the target data sets and elements for a given source data set/element, and/or (iii) all upstream or downstream dependencies for a given data set/element. Access to the lineage API 122 may be controlled by access controls, rate limiting, and robust error handling techniques to ensure the lineage API 122 is secure and stable. The lineage API 122 may enable seamless integration of lineage inferences into business applications.

The cloud platform 108 may expose data flow lineage via cloud services for ease of access. The cloud platform 108 may provide access to developer tools, user interface (UI) dashboards, notifications, and integrations. Examples of cloud platforms include Amazon Web Services (AWS), Microsoft Azure, Google Cloud Platform (GCP). The client devices 106 may enable users to access lineage information in different ways, such as querying via APIs, visualizing graphs in a UI dashboard, or receiving notifications when impact changes occur.

In some cases, the lineage API 122 can query the data flow graphs stored by the graph persistence database 120 to determine relationships between data sets and provide these determined relationships to client devices 106 in response to queries. The lineage API 122 may also provide UI access to the determined relationships using a cloud platform 108, such as an AWS software application.

Accordingly, the environment 100 enables better visibility into data flows across systems by collecting metadata, modeling lineage relationships via graphs, persisting them in a graph persistence database, and exposing APIs to query lineage information. To accomplish these objectives, the data management server 110 enables tracking data lineage relationships across different data processing applications 104 operating on different datasets. The data management server 110 uses a metadata collector 112 to collect metadata about how data flows between data sets 102 via various data processing applications 104. Collecting such metadata may include tracking information like source datasets, target datasets, data transformations, and mappings between data elements. The data management server 110 also uses a graph generator 116 to generate data flow graphs that model relationships between data sets and data elements as represented by the collected metadata. A graph converter 118 of the data management server 110 then optimizes these graphs to show direct relationships between data sets and elements, removing intermediary nodes. A graph persistence database 120 may then store these optimized lineage graphs so they can be queried later to understand data flows. Using the optimized lineage graphs stored in the graph persistence database 120, the data management server 110 may provide APIs and services to allow users to query the lineage graphs and retrieve information about upstream/downstream data set dependencies and element mappings.

In some examples, the data management server 110 improves computational efficiency of data ingestion from the data processing applications 104. Specifically, the data management server 110 may use agents and SDKs to collect metadata directly from data processing applications as operations occur. This allows for automated, real-time ingestion of metadata without needing manual processes. By leveraging APIs and integrations with applications, the metadata can be efficiently streamed to the metadata repository as transformations happen. This provides an automated way to gather rich, timely metadata.

In some examples, the data management server 110 enables storing a graph structure in an optimized way. Specifically, the data management server 110 may transform the initial data flow graphs to optimize their structure for analysis. Techniques like graph expansion and reduction modify the graphs to expose direct relationships between data sets and elements. This optimization eliminates unnecessary intermediary nodes and edges, simplifying the graphs. The optimized structure improves computational performance for querying and traversing the graphs to derive lineage. It also reduces storage needs for the graphs.

In some examples, the data management server 110 enables persistent storage of historic lineage data in an optimized way. Specifically, storing the optimized data flow graphs in a dedicated graph persistence database provides persistence of historical lineage data. As new metadata comes in, the graphs can be incrementally updated. This persistent repository improves lineage analysis by enabling both current and historical relationships to be queried. It also avoids needing to re-generate graphs each time a query is run, thus improving performance and real-time responsiveness of the lineage API 122.

In some examples, the data management server 110 enables user-friendly access to lineage data. Specifically, in some examples, the lineage API 122 provides an interface for querying the graph persistence database to retrieve lineage information. This enables lineage data to be easily obtained by various users and systems. Thus, the lineage API 122 may abstract the underlying graph traversal and analysis, thus simplifying access to lineage data.

Figure 2:
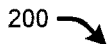
FIG. 2 is a flowchart diagram of an example process for performing graph expansion on a data flow graph.
Figure 2:
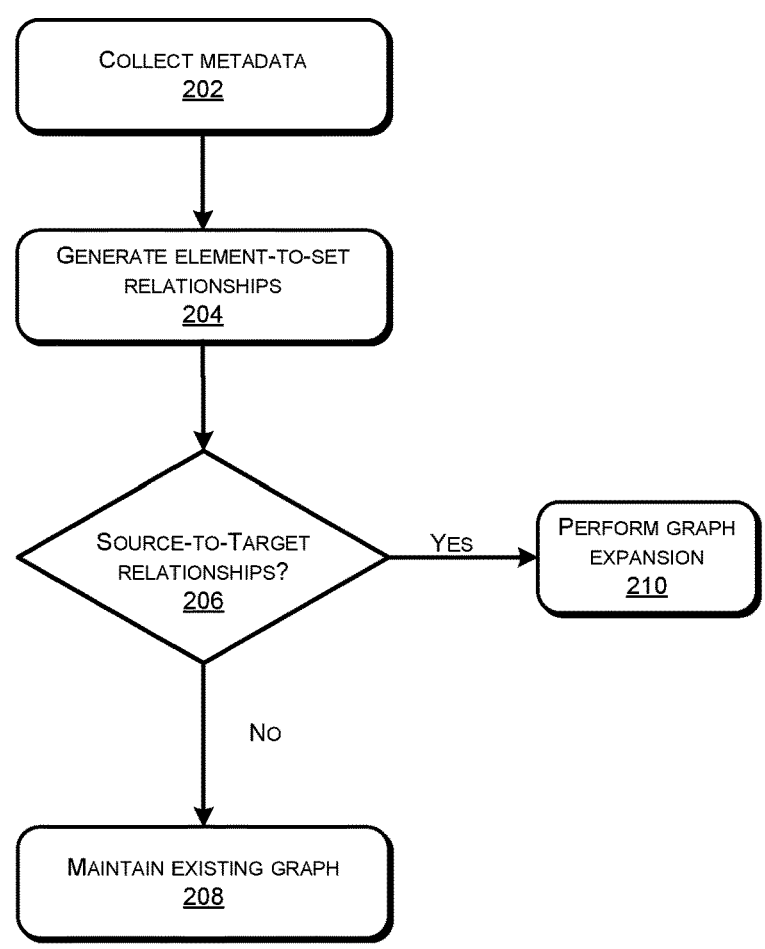

FIG. 2 is a flowchart diagram of an example process 200 for performing graph expansion on a data flow graph. As depicted in FIG. 2, at operation 202, the metadata collector 112 collects metadata from a set of data processing applications 104. The metadata may include information about which data elements are stored on which data sets and/or information about functions (e.g., ETL functions) that process source data to generate target data. After extracting metadata from the data processing applications 104, the metadata collector 112 may store the extracted metadata in the metadata repository 114. In some cases, the metadata collector 112 receives data generated by metadata collection agents executed by the data processing applications 104.

At operation 204, the graph generator 116 generates direct relationships between data elements and data sets in a data flow graph based on the collected metadata. A direct relationship between a data set and a data element may represent at least one of the following: (i) that the data element belongs to (i.e., is a part of) the data set, or (ii) that at least a part of the data in the data set is determined based on the data element. For example, if a target data element of a target data set is determined based on a source element of a source data set, the graph generator 116 may generate a first direct relationship between the source data set and the source data element and a second direct relationship between the source data element and the target data set.

A direct relationship between a data set and a data element may be represented by an edge in the data flow graph between a node corresponding to the data set and a node corresponding to the data element. In some examples, a direct relationship between a data set and a data element is represented by a directed edge between the corresponding nodes.

For example, if a direct relationship indicates that the corresponding data element belongs to the corresponding data element, then the edge representing this relationship may be a directed edge from the node corresponding to the data set to the node corresponding to the data element. As another example, if a direct relationship indicates that the corresponding data sets includes data determined based on the corresponding data element, then the edge representing this relationship may be a directed edge from the node corresponding to the data element to the node corresponding to the data set.

In some examples, the graph generator 116 may generate a direct relationship between a data set and a data element based on at least one of: (i) collected metadata representing structure of data in the data sets 102, or (ii) collected metadata representing functions performed by the data processing applications 104 on the data sets. For example, the graph generator 116 may use collected metadata representing structure of data in the data sets 102 to determine a direct relationship indicates that the corresponding data element belongs to the corresponding data element. As another example, the graph generator 116 may use collected metadata representing functions performed by the data processing applications 104 on the data sets to a direct relationship indicates that the corresponding data sets includes data determined based on the corresponding data element.

For example, the graph generator 116 may collect metadata about data processing functions applied by a data processing application 104 (e.g., an ETL tool) on a source data set and use such collected metadata to determine that the data stored on a target data set is determined based at least in part on source data element(s) of a source data set.

In some cases, if the collected metadata indicates that a data processing function applied by a data processing application 104 to generate a target data element of a target data set includes a source data element as an input, then the graph generator 116 may process such metadata to determine a direct relationship between the source data element and the target data set. In some cases, if the collected metadata indicates that a data processing function applied by a data processing application 104 to generate a target data element of a target data set performs an operation on a source data element, then the graph generator 116 may process such metadata to determine a direct relationship between the source data element and the target data set. In some cases, if the collected metadata indicates that a data processing function applied by a data processing application 104 to generate a target data element of a target data set neither receives a source data element as an input or performs an operation on a source data element, then the graph generator 116 may ignore such metadata when generating source-to-target relationships between source data elements and target data elements.

At operation 206, the graph converter 118 determines whether the direct relationships determined at operation 204 include any relationships between source data elements and target data sets. A relationship between a source data element and a target data set may represent that the data in the target data set is determined based at least in part on the source data element.

For example, if at least a portion of a target data set is determined by copying at least a portion of a source data set, then a data flow graph may represent this data processing function using direct relationship(s) between the copied portion of the source data set and the target data set. As another example, if at least a portion of a target data set is determined by transforming at least a portion of a source data set, then a data flow graph may represent this data processing function using direct relationship(s) between the transformed portion of the source data set and the target data set. As an additional example, if at least a portion of a target data set is determined based on (e.g., by summing) a first portion of a first data set and a second portion of a second data set, then a data flow graph may represent this data processing function using direct relationship(s) between the target data set and the first portion and direct relationship(s) between the target data set and the second portion.

At operation 208, if the direct relationships determined at operation 204 does not include any relationships between source data elements and target data sets, then the graph converter 118 does not perform any graph expansion operations. However, if the direct relationships determined at operation 204 includes one or more relationships between source data elements and target data sets, then (at operation 210) the graph converter 118, then the graph converter 118 performs graph expansion operations on those source-to-target relationship.

In some cases, to perform a graph expansion operation with respect to a source-to-target relationship between a source data element and a target data set, the graph converter 118 replaces the source-to-target relationship with a first relationship between the source data element and the target data element of the target data set that is determined based on the source data element, and a second relationship between the target data element and the target data set.

For example, the graph converter 118 might identify a specific data function performed by a data processing application 104, like an ETL process, which transforms a source data element to generate a target data element. In such cases, the graph converter 118 can replace the initial direct relationship between the source data element and target data set with a new relationship that links the source data element directly to the newly created target data element. Subsequently, a second relationship is established between this new target data element and the target data set. This dual relationship reflects the process of transformation from the source data element to the final target data set through the intermediary of the target data element.

In some cases, the graph converter 118 additionally examines whether the relationships established at operation 208 include any complex relationships. A complex relationship might indicate that the data in the target data set is determined not solely by a single source data element but a combination of two or more source data elements. For example, a complex relationship could be represented when a part of the target data set is generated by an operation like aggregation or summing of multiple source data elements from various source data sets. In such a scenario, the graph converter 118 may execute a second round of graph expansion. Here, the complex relationship initially established between multiple source data elements and the target data set is replaced with individual relationships between each source data element and an intermediary data element, which then links to the target data set. These intermediary data elements represent the outcome of operations on multiple source data elements, providing a more granular view of the data processing flow.

For example, consider an example where a data processing application performs a transformation operation involving two source data elements—element X from source data set A and element Y from source data set B—to produce a part of target data set Z. In this situation, a complex relationship exists where a portion of the data in target data set Z is derived from a combination of source data elements X and Y. Prior to the second round of graph expansion, the graph could show this as a single edge (complex relationship) from nodes X and Y (representing source data elements X and Y) to node Z (representing target data set Z). However, during the second round, the graph converter 118 identifies this complex relationship and initiates the second round of graph expansion. It introduces an intermediary node M, representing the result of the transformation operation on data elements X and Y. Now, instead of a single edge from X and Y to Z, the graph converter creates two new edges: one from node X to node M, and another from node Y to node M, signifying the individual relationships between each source data element and the transformation result. It also establishes a new edge from node M to node Z, representing the relationship between the transformation outcome and the target data set Z. After this second round of graph expansion, the singular complex relationship has been dissected into more precise relationships, providing a more detailed depiction of the data processing flow. The graph now accurately conveys the specific transformations and operations—in this case, a transformation involving X and Y—that are involved in the production of target data set Z from source data elements X and Y.

Figure 3:
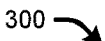
FIG. 3 is a flowchart diagram of an example process for performing graph reduction operations.
Figure 3:
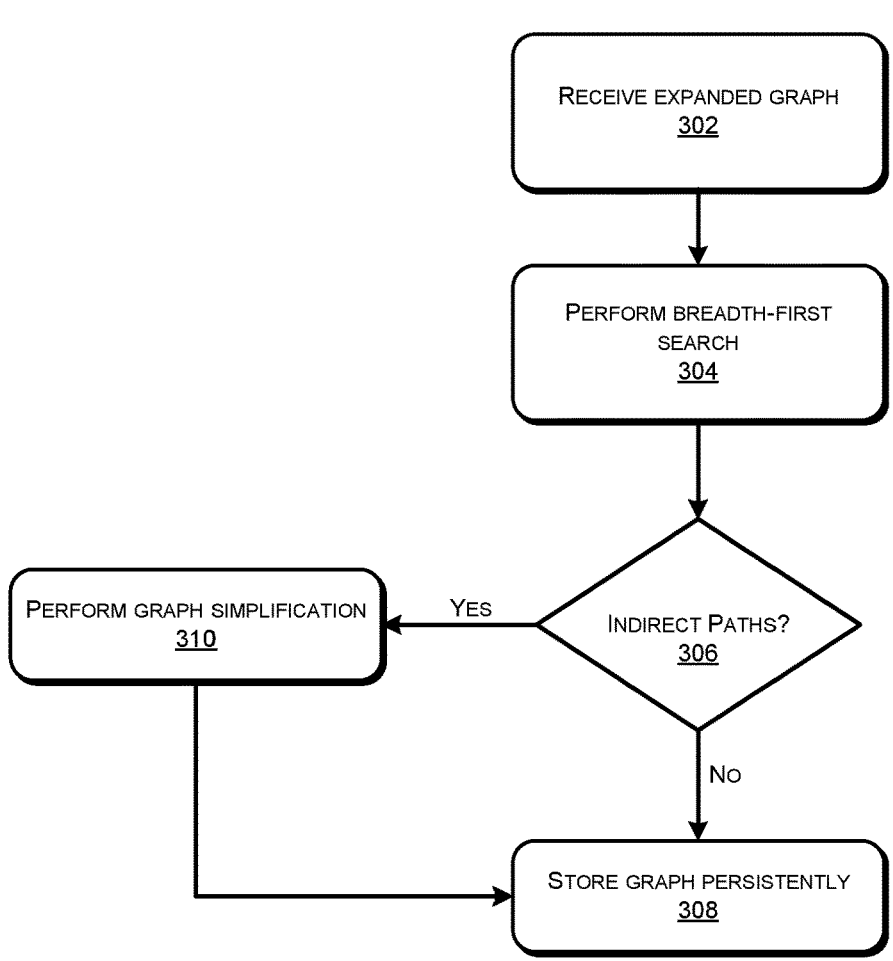

FIG. 3 is a flowchart diagram of an example process 300 for performing graph reduction operations. At operation 302, the graph converter 118 identifies an expanded data flow graph. The graph converter 118 may generate the expanded data flow graph by performing graph expansion operation(s) on an original data flow graph, for example using the techniques described above in relation to FIG. 2.

At operation 304, the graph converter 118 performs a breadth-first search (BFS) traversal of the expanded data flow graph to determine whether there any two nodes corresponding to two data sets are indirectly connected.

The graph converter 118 may initiate BFS traversal from a source node, which corresponds to a particular data set. It begins by inspecting all nodes directly connected to the source node, marking them as "visited." Once every directly connected node of the source node has been checked, the algorithm progresses to one of these visited nodes and repeats the process, examining all its neighboring nodes. This process continues, advancing layer by layer from the source node, and operates until it either locates the target node (demonstrating that a connection exists), or after visiting all nodes without locating the target node (implying no connection exists). To keep track of the nodes set for inspection, the BFS algorithm maintains a queue. It starts by enqueuing the source node and then enters a loop where it continuously dequeues a node, checks all of that node's unvisited neighbors, and enqueues any newly visited nodes. If it encounters the target node at any point during this process, the BFS algorithm halts and concludes that a connection is indeed present. If it exhausts all nodes without encountering the target node, it concludes that no connection exists between the source and target nodes. In this way, the graph converter 118 uses the BFS traversal during operation 304 to identify if any two nodes, corresponding to two data sets, are indirectly connected in the expanded data flow graph.

In some cases, as an alternative to the breadth-first search, the graph converter 118 can utilize the Floyd-Warshall algorithm to identify connections in the expanded data flow graph. The Floyd-Warshall algorithm is a dynamic programming algorithm that computes the shortest paths between all pairs of vertices in a weighted graph. This algorithm is particularly useful when we want to find out if there is a path between any two nodes, such as nodes corresponding to two different data sets, in the graph. Initially, the graph converter 118 sets up a matrix, where each cell value represents the weight of the edge connecting two nodes or vertices. If there is no direct edge between two vertices, the cell is assigned a value of infinity (or a very large number to represent an infinite distance). The diagonal of the matrix, representing the distance from each vertex to itself, is initialized to zero. Following this initialization, the graph converter 118 applies the Floyd-Warshall algorithm, which performs a series of iterations over the matrix. For each iteration, the algorithm checks for each pair of vertices whether a path through the current vertex improves the known path between the vertices. If a shorter path is found, the value in the matrix is updated with this shorter distance. At the end of these iterations, the matrix contains the shortest distances between all pairs of vertices. The graph converter 118 can then use this information to determine whether there's a path between any two nodes in the graph, hence indicating a connection. This makes the Floyd-Warshall algorithm a suitable method for the graph converter 118 to identify connections in the expanded data flow graph in operation 304.

At operation 306, the graph converter 118 determines whether operation 304 detected indirect paths between data set nodes. If not, then the graph converter 118 does not simplify the data flow graph (operation 308). However, if operation 304 detects at least one indirect path between a pair of data set nodes, then (at operation 310) the graph converter 118 performs one or more graph reduction operation. In some cases, the graph converter 118 removes the intermediary nodes and edges that include the indirect connection, replacing them with a single, direct edge between the two data set nodes. This new edge effectively encapsulates the full transformational relationship between the two data sets.

For example, consider a scenario where operation 304 detects an indirect path between two nodes D1 and D3 that correspond to two data sets, through an intermediary data set node D2, data element nodes E1, E2, E3 and E4, and corresponding edges e1, e2, e3, and e4. For example, edge e1 might connect data set D1 with data element E1, edge e2 might connect data element E1 to data set D2, edge e3 could connect data set D2 to data element E2, and finally, edge e4 might connect data element E2 to data set D3. This chain of nodes and edges might represent a complex sequence of data transformations, where data set D3 is derived from data set D1 through a series of operations that involve intermediary data sets and data elements.

Upon identifying this indirect pathway, the process moves to operation 310, where the graph converter 118 conducts the graph reduction operation. Here, the graph converter 118 eliminates the intermediary data set node D2, data element nodes E1 and E2, and the edges e1, e2, e3, and e4 that make up the indirect connection. This eradication results in a more streamlined graph where the intermediary transformations are abstracted. Subsequently, the graph converter 118 establishes a single, direct edge e5 between the initial data set node D1 and the final data set node D3. This new edge e5 represents the entire transformation process between the data sets D1 and D3. The simplified graph now provides a more consolidated, less intricate view of the data flow, while still capturing the critical transformation relationship between the two data sets. The graph converter 118 repeats this operation for every pair of data set nodes that are indirectly connected, as detected in operation 304. The final product is a significantly simplified data flow graph that is easier to understand and navigate, whilst still maintaining essential information about the relationships between different data sets and data elements.

Figure 4A:
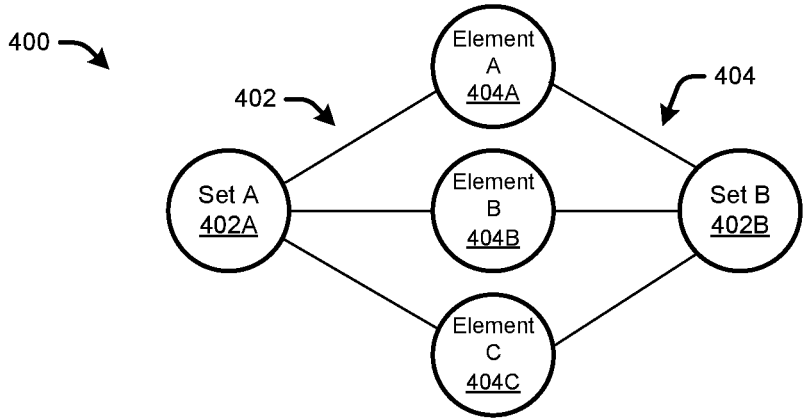
FIG. 4A provides an operational example of a data flow graph before any graph expansion or graph reduction operations.

FIG. 4A provides an operational example of a data flow graph 400 before any graph expansion or graph reduction operations. As depicted in FIG. 4A, the data flow graph 400 includes direct relationships between a source data set A 402A and source data elements A-C 404A-C, for example the direct relationship 402 between the source data set A 402A and source data element A 404A. As further depicted in FIG. 4A, the data flow graph 400 includes direct relationships between a target data set B 402B and source data elements A-C 404A-C, for example the direct relationship 404 between the target data set B 402B and source data element A 404A.

Figure 4B:
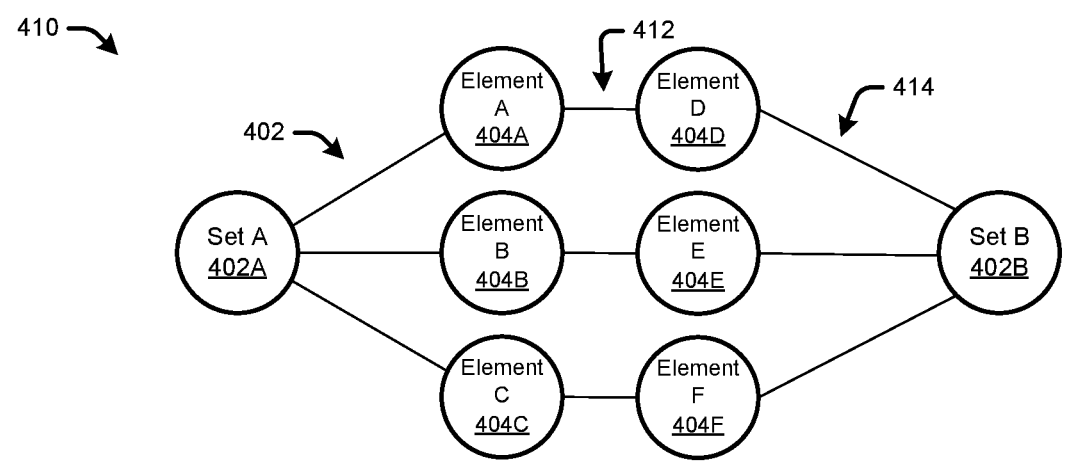
FIG. 4B provides an operational example of an expanded data flow graph resulting from performing graph expansion operations on a data flow graph.

FIG. 4B provides an operational example of an expanded data flow graph 410 resulting from performing graph expansion operations on the data flow graph 400 of FIG. 4A. As depicted in FIG. 4B, the expanded data flow graph 410 represents those elements of the target data set B 402B that are determined based the source data elements A-C 404A-C using explicit nodes, in particular using nodes corresponding to target data elements D-F 404D-F. To generate the expanded data flow graph 410, the graph converter 118 may replace direct relationships between source data elements and target data sets with direct relationships between source data elements and target data elements and direct relationships between target data elements and target data sets. For example, as depicted in FIG. 4B, to generate the expanded data flow graph 410, the graph converter 118 has replaced the direct relationship 404 between the source data element A 404A and the target data set B 402B with a direct relationship 412 between the source data element A 404A and the target data element D 404D and a direct relationship 414 between the target data element D 404D and the target data set B 402B.

Figure 4C:
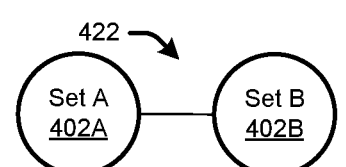
FIG. 4C provides an operational example of a reduced data flow graph resulting from performing graph reduction operations on an expanded data flow graph.

FIG. 4C provides an operational example of a reduced data flow graph 420 resulting from performing graph reduction operations on the expanded data flow graph 410 of FIG. 4C. To generate the reduced data flow graph, the graph converter 118 may replace intermediate direct relationships between source data sets and target data sets with direct relationships those data sets. For example, as depicted in FIG. 4C, to generate the reduced data flow graph 420, the graph converter 118 has replaced all of the direct relationships in the expanded data flow graph 410 of FIG. 4B with the direct relationship 422 between the source data set A 402A and the target data set B 402B.

FIG. 5A provides an operational example of a data processing function 500 that receives values from two data sets X and Y as inputs and stores the resulting summation values in a data set Z. This data processing function 500 may be executed by a data processing application 104, such as an ETL tool. As depicted in FIG. 5A, the data processing function 500 sums values from the two data sets X and Y. The graph generator 116 may process metadata representing the data processing function 500 to determine source-to-target relationship(s) between the data elements of source data set X and the target data set Z as well as source-to-target relationship(s) between data elements of source data set Y and the target data set Z.

FIG. 5B provides an operational of a data processing function 510 that processes values from a data set X and stores the product of those values with a constant value in a data set Z. This data processing function 500 may be executed by a data processing application 104, such as an ETL tool or an API. As depicted in FIG. 5B, the data processing function 510 multiplies values from the data set X with the constant value of 3.14. The graph generator 116 may process metadata representing the data processing function 510 to determine source-to-target relationship(s) between the data elements of source data set X and the target data set Z.

FIG. 5C provides an operational example of a data processing function 520 that stores an input parameter received by a function call to a file. This data processing function 500 may be executed by a data processing application 104, such as an ETL tool. The graph generator 116 may process metadata representing the data processing function 520 to determine that the data processing function 520 does not indicate any relationships between data elements and data sets. Accordingly, the graph generator 116 may ignore the data processing function 520 when generating a data flow graph.

Figure 6:
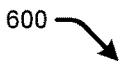
FIG. 6 is a data flow diagram of an example process for enabling access to data lineage information.
Figure 6:
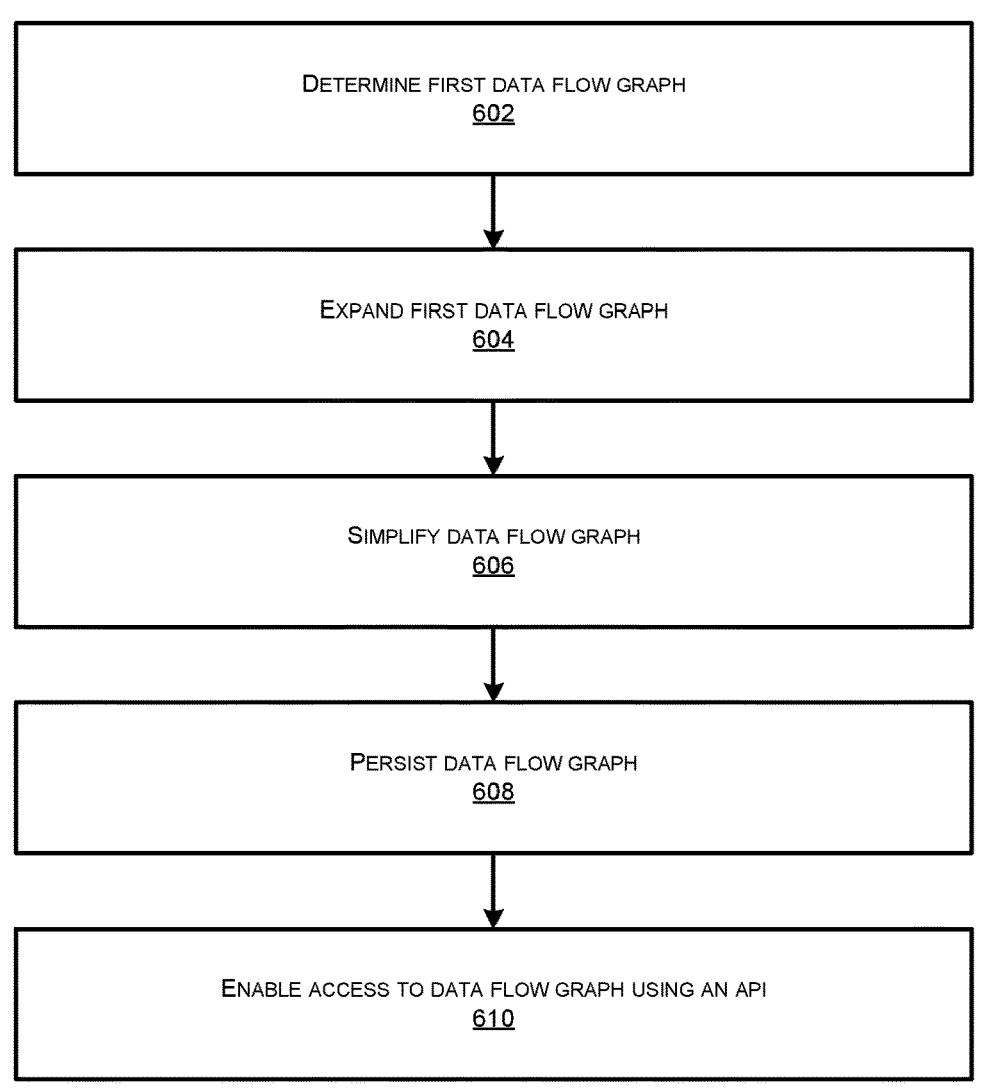

FIG. 6 is a data flow diagram of an example process 600 for enabling access to data lineage information using an API. At operation 602, the graph generator 116 generates a first data flow graph. The first data flow graph may have nodes corresponding to data sets, nodes corresponding to data elements, edges representing that particular data elements belong to particular data sets, and edges representing that particular data sets are determined based on particular data elements. In some cases, the data flow graph a first direct relationship between a first data set and a first data element of the first data set, and a second direct relationship between the first data element and a second data set.

At operation 604, the graph converter 118 expands the first data flow graph to generate a second data flow graph. In some cases, expanding the second data flow graph includes modifying the first data flow graph to replace the second direct relationship with: (i) a third direct relationship between the first data element and a second data element of the second data set that is determined based on the first data element, and (ii) a fourth direct relationship between the second data element and the second data set.

At operation 606, the graph converter 118 simplifies the second data flow graph to generate a third data flow graph. In some cases, simplifying the second data flow graph includes determining the second data flow graph represents a first indirect relationship between the first data set and the second data set.

In some cases, simplifying the second data flow graph includes, in response to determining that the second data flow graph represents the first indirect relationship between the first data set and the second data set, modifying the second data flow graph to replace the first direct relationship, the third direct relationship, and the fourth direct relationship with a fifth direct relationship between the first data set and the second data set. In some cases, the first indirect relationship represents a shortest path between a first node of the second data flow graph that corresponds to the first data set and a second node of the second data flow graph that corresponds to the second data set. In some cases, determining the shortest path comprises processing the second data flow graph using a dynamic programming routine, such as a Floyd-Warshall algorithm routine.

At operation 608, the graph persistence database 120 stores the third data flow graph (e.g., using a relational data model). In some cases, the database is a relational database. Several techniques can be used for storing a graph using a relational data model. All of those techniques require representing nodes and edges of the graph in a tabular form.

One approach for storing graphs using a relational data model involves the use of adjacency lists, where each node in the graph is stored as a record in a table and associated with a list of nodes to which it is connected. For instance, in a table named "Nodes," each row could represent a node, and a separate "Adjacency" table could be used to store pairs of node IDs to represent edges between nodes. In addition to adjacency lists, the adjacency matrix method can be employed. An adjacency matrix is a square matrix with rows and columns being represented by the graph nodes. Each cell in the matrix corresponds to a pair of nodes, with the value in the cell indicating the existence (e.g., with a 1) or absence (e.g., with a 0) of an edge between the nodes. However, while adjacency matrices are intuitive, they may not be space-efficient for large, sparse graphs as most cells will be filled with zeroes. Another technique is the edge list method, which uses a table to store all the edges in the graph. Each row in the table represents an edge, including identifiers for the start and end nodes, and potentially additional information like edge weight or direction. This approach is straightforward and allows for easy addition or removal of edges, but may not be as fast for checking the existence of an edge between two specific nodes as the adjacency matrix method. For directed graphs, where edges have a direction from one node to another, these techniques can be extended to account for edge direction. In an adjacency list, this approach may require including information about the direction of each edge in the list. In an adjacency matrix, it can mean using asymmetric matrices where the entry in the ith row and jth column is not necessarily the same as the entry in the jth row and ith column.

At operation 610, the lineage API 122 enables access to the stored third data flow graph using an API. In some cases, after the third data flow graph is stored in a database, the database is accessible via a database query. The lineage API 122 may provide a series of database queries or functions that facilitate access to specific data points or relationships in the third data flow graph. These queries could be tailored to address frequent or anticipated data requests, such as retrieving the connections for a specific data set, identifying the source elements for a particular target data set, or determining the sequence of operations performed on a particular data element.

In some cases, the lineage API 122 also provides an interface to external applications or services that require information about the data processing operations encoded in the third data flow graph. These might include data management applications, data auditing tools, or business intelligence applications, among others. By providing such access, the lineage API 122 facilitates a deeper understanding of the data processing activities within the system, as well as better data governance, compliance, and decision-making.

The lineage API 122 may also provide the capability to update the third data flow graph as changes occur in the underlying data processing applications. These changes could include modifications to the data sets, the addition or deletion of data processing applications, or changes to the data processing functions within these applications. By updating the data flow graph in response to these changes, the lineage API 122 ensures that the graph accurately reflects the current state of the data processing operations, thereby maintaining the integrity of the information provided to users and applications.

Additionally, the lineage API 122 may enable users to perform advanced data analytics operations on the third data flow graph. By utilizing the structure and relationships captured in the graph, users can perform complex queries, such as identifying common sources for multiple target data sets, determining the impact of changes in a source data set on dependent target data sets, or analyzing the efficiency of the data processing operations. These analytics outputs provide users with valuable insights into their data processing operations. The analytics outputs may also users to optimize their data management practices and make more informed decisions about their data strategy.

Figure 7:
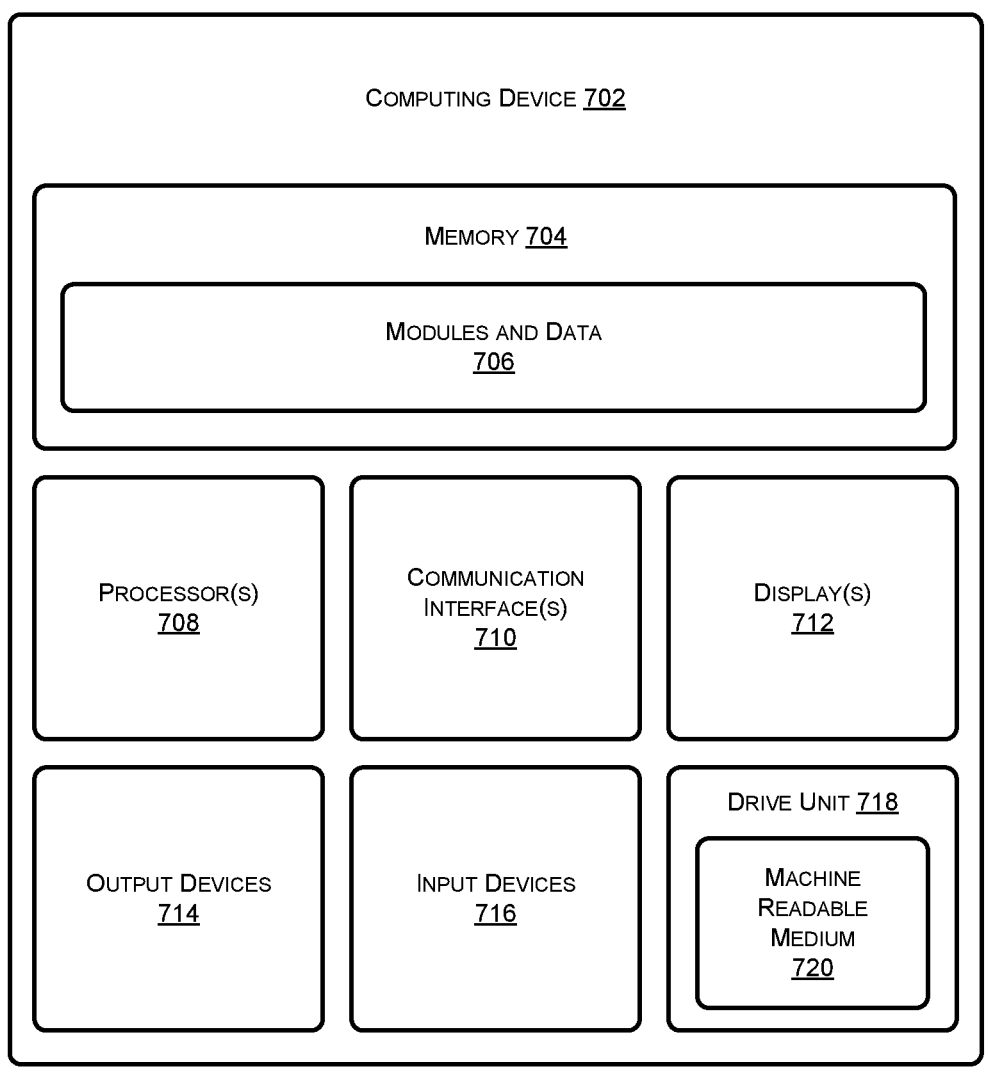
FIG. 7 shows an example system architecture for a computing device that may execute operations configured to enable coordinated asynchronous and real-time updates of a database.

FIG. 7 shows an example system architecture for a computing device 702 associated with the environment 100 described herein. A computing device 702 can be a server, computer, or other type of computing device that executes at least a portion of the environment 100. In some examples, elements of the environment 100 can be distributed among, and/or be executed by, multiple computing devices 702.

A computing device 702 can include memory 704. In various examples, the memory 704 can include system memory, which may be volatile (such as RAM), non-volatile (such as ROM, flash memory, etc.) or some combination of the two. The memory 704 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media.

Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 702 associated with the environment 100. Any such non-transitory computer-readable media may be part of the computing devices 702. The memory 704 can include modules and data 706 needed to perform operations of one or more computing devices 702 of the environment 100.

One or more computing devices 702 of the environment 100 can also have processor(s) 708, communication interfaces 710, displays 712, output devices 714, input devices 716, and/or a drive unit 718 including a machine readable medium 720.

In various examples, the processor(s) 708 can be a central processing unit (CPU), a graphics processing unit (GPU), both a CPU and a GPU, or any other type of processing unit. Each of the one or more processor(s) 708 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 708 may also be responsible for executing computer applications stored in the memory 704, which can be associated with common types of volatile (RAM) and/or nonvolatile (ROM) memory.

The communication interfaces 710 can include transceivers, modems, interfaces, antennas, telephone connections, and/or other components that can transmit and/or receive data over networks, telephone lines, or other connections.

The display 712 can be a liquid crystal display or any other type of display commonly used in computing devices. For example, a display 712 may be a touch-sensitive display screen, and can then also act as an input device or keypad, such as for providing a soft-key keyboard, navigation buttons, or any other type of input.

The output devices 714 can include any sort of output devices known in the art, such as a display 712, speakers, a vibrating mechanism, and/or a tactile feedback mechanism. Output devices 714 can also include ports for one or more peripheral devices, such as headphones, peripheral speakers, and/or a peripheral display.

The input devices 716 can include any sort of input devices known in the art. For example, input devices 716 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 720 can store one or more sets of instructions, such as software or firmware, that embodies any one or more of the methodologies or functions described herein. The instructions can also reside, completely or at least partially, within the memory 704, processor(s) 708, and/or communication interface(s) 710 during execution thereof by the one or more computing devices 702 of the environment 100. The memory 704 and the processor(s) 708 also can constitute machine readable media 720.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
   receiving, by a processor, a first data flow graph that represents:
   a first direct relationship between a first data set and a first data element of the first data set, and a second direct relationship between the first data element and a second data set;

generating, by the processor, a second data flow graph by modifying the first data flow graph to replace the second direct relationship with:

a third direct relationship between the first data element and a second data element of the second data set that is determined based on the first data element, and a fourth direct relationship between the second data element and the second data set;

determining, by the processor and based on determining that a set of intermediate direct relationships connect the first data set to the second data set, that the second data flow graph represents a first indirect relationship between the first data set and the second data set;

determining, by the processor and based on the second data flow graph, that the set of intermediate direct relationships comprises the first direct relationship, the third direct relationship, and the fourth direct relationship from the second data flow graph;

generating, by the processor, and in response to determining that the second data flow graph represents the first indirect relationship between the first data set and the second data set, a third data flow graph by modifying the second data flow graph to replace the first direct relationship, the third direct relationship, and the fourth direct relationship with a fifth direct relationship between the first data set and the second data set, wherein generating the third data flow graph comprises:

removing, based on determining that the first direct relationship, the third direct relationship, and the fourth direct relationship from the second data flow graph are in the set of intermediate direct relationships connecting the first data set to the second data set, the first direct relationship, the third direct relationship, and the fourth direct relationship from the second data flow graph; and storing, by the processor, the third data flow graph in a database, wherein the third data flow graph is accessible in the database via a database query.

2. The method of claim 1, further comprising:

determining, by the processor, that the first data flow graph represents a sixth direct relationship between a third data element of the first data set and a seventh direct relationship between the first data element and the second data set;

generating, by the processor, the second data flow graph by replacing the seventh direct relationship with: (i) an eighth direct relationship between the third data element and a fourth data element of the second data set that is determined based on the third data element, and (ii) a ninth direct relationship between the fourth data element and the second data set; and determining, by the processor, the third data flow graph by removing the sixth direct relationship, the eighth direct relationship, and the ninth direct relationship.

3. The method of claim 1, wherein the database is a relational database.

4. The method of claim 1, wherein the first indirect relationship represents a shortest path between a first node of the second data flow graph that corresponds to the first data set and a second node of the second data flow graph that corresponds to the second data set.

5. The method of claim 4, wherein determining the shortest path comprises processing the second data flow graph using a dynamic programming routine.

6. The method of claim 5, wherein the dynamic programming routine uses a Floyd-Warshall traversal of the second data flow graph.

7. The method of claim 1, further comprising determining the first data flow graph, wherein determining the first data flow graph comprises:

monitoring a data processing application that transforms data between a plurality of data sets comprising the first data set and the second data set;

extracting metadata from the data processing application, wherein the metadata comprises information about source data sets, target data sets, data transformations, and relationships between data elements; and generating the first data flow graph based on the metadata.

8. The method of claim 7, wherein the data processing application is an extract-transform-load application.

9. The method of claim 7, wherein the data processing application is executed by a database management system.

10. The method of claim 1, wherein determining the first indirect relationship comprises performing a breadth-first search traversal on the second data flow graph.

11. The method of claim 1, further comprising:

determining, by the processor, that the second data flow graph comprises a third data element that lacks an outgoing direct relationship and a fourth data element that lacks an incoming direct relationship;

determining, by the processor, that the fourth data element is determined based on the third data element, wherein determining that the fourth data element is determined based on the third data element is based on at least one of: (i) a first data type of the third data element and a second data type of the fourth data element, or (ii) a first extract, transform, and load (ETL) routine used to extract the third data element and a second ETL routine used to extract the fourth data element; and generating, by the processor and based on determining the fourth data element is determined based on the third data element, a sixth direct relationship in the second data flow graph from the third data element to the fourth data element.

12. The method of claim 1, further comprising:

determining, by the processor, that the first data flow graph comprises a third data element that lacks an outgoing direct relationship and a fourth data element that lacks an incoming direct relationship;

determining, by the processor, that the fourth data element is determined based on the third data element, wherein determining that the fourth data element is determined based on the third data element is based on at least one of: (i) a first data type of the third data element and a second data type of the fourth data element, or (ii) a first extract, transform, and load (ETL) routine used to extract the third data element and a second ETL routine used to extract the fourth data element; and generating, by the processor and based on determining the fourth data element is determined based on the third data element, a sixth direct relationship in the first data flow graph from the third data element to the fourth data element.

13. The method of claim 1, further comprising:

determining, by the processor, that the third data flow graph comprises a third data element that lacks an outgoing direct relationship and a fourth data element that lacks an incoming direct relationship;

determining, by the processor, that the fourth data element is determined based on the third data element, wherein determining that the fourth data element is determined based on the third data element is based on at least one of: (i) a first data type of the third data element and a second data type of the fourth data element, or (ii) a first extract, transform, and load (ETL) routine used to extract the third data element and a second ETL routine used to extract the fourth data element; and generating, by the processor and based on determining the fourth data element is determined based on the third data element, a sixth direct relationship in the third data flow graph from the third data element to the fourth data element.

14. The method of claim 1, wherein:

the third direct relationship represents an extract, transform, and load (ETL) process; and the fourth direct relationship represents that the first data element belongs to the second data set.

15. A computing system comprising a processor and memory storing computer-executable instructions that, when executed by the processor, cause the computing system to perform operations comprising:

receiving, by the processor, a first data flow graph that represents:

a first direct relationship between a first data set and a first data element of the first data set, and a second direct relationship between the first data element and a second data set;

generating, by the processor, a second data flow graph by modifying the first data flow graph to replace the second direct relationship with:

a third direct relationship between the first data element and a second data element of the second data set that is determined based on the first data element, and a fourth direct relationship between the second data element and the second data set;

determining, by the processor and based on determining that a set of intermediate direct relationships connect the first data set to the second data set, that the second data flow graph represents a first indirect relationship between the first data set and the second data set;

determining, by the processor and based on the second data flow graph, that the set of intermediate direct relationships comprises the first direct relationship, the third direct relationship, and the fourth direct relationship from the second data flow graph;

generating, by the processor, and in response to determining that the second data flow graph represents the first indirect relationship between the first data set and the second data set, a third data flow graph by modifying the second data flow graph to replace the first direct relationship, the third direct relationship, and the fourth direct relationship with a fifth direct relationship between the first data set and the second data set, wherein generating the third data flow graph comprises:

removing, based on determining that the first direct relationship, the third direct relationship, and the fourth direct relationship from the second data flow graph are in the set of intermediate direct relationships connecting the first data set to the second data set, the first direct relationship, the third direct relationship, and the fourth direct relationship from the second data flow graph; and storing, by the processor, the third data flow graph in a database, wherein the third data flow graph is accessible in the database via a database query.

16. The computing system of claim 15, the operations further comprising:

determining, by the processor, that the first data flow graph represents a sixth direct relationship between a third data element of the first data set and a seventh direct relationship between the first data element and the second data set;

generating, by the processor, the second data flow graph by replacing the seventh direct relationship with: (i) an eighth direct relationship between the third data element and a fourth data element of the second data set that is determined based on the third data element, and (ii) a ninth direct relationship between the fourth data element and the second data set; and determining, by the processor, the third data flow graph by removing the sixth direct relationship, the eighth direct relationship, and the ninth direct relationship.

17. The computing system of claim 15, wherein the first indirect relationship represents a shortest path between a first node of the second data flow graph that corresponds to the first data set and a second node of the second data flow graph that corresponds to the second data set.

18. The computing system of claim 15, the operations further comprising determining the first data flow graph, wherein determining the first data flow graph comprises:

monitoring a data processing application that transforms data between a plurality of data sets comprising the first data set and the second data set;

extracting metadata from the data processing application, wherein the metadata comprises information about source data sets, target data sets, data transformations, and relationships between data elements; and generating the first data flow graph based on the metadata.

19. One or more non-transitory computer-readable media storing computer-executable instructions that, when executed by a processor, cause the processor to perform operations, comprising:

receiving, by the processor, a first data flow graph that represents:

a first direct relationship between a first data set and a first data element of the first data set, and a second direct relationship between the first data element and a second data set;

generating, by the processor, a second data flow graph by modifying the first data flow graph to replace the second direct relationship with:

a third direct relationship between the first data element and a second data element of the second data set that is determined based on the first data element, and a fourth direct relationship between the second data element and the second data set;

determining, by the processor and based on determining that a set of intermediate direct relationships connect the first data set to the second data set, that the second data flow graph represents a first indirect relationship between the first data set and the second data set;

determining, by the processor and based on the second data flow graph, that the set of intermediate direct relationships comprises the first direct relationship, the third direct relationship, and the fourth direct relationship from the second data flow graph;

generating, by the processor, and in response to determining that the second data flow graph represents the first indirect relationship between the first data set and the second data set, a third data flow graph by modifying the second data flow graph to replace the first direct relationship, the third direct relationship, and the fourth direct relationship with a fifth direct relationship between the first data set and the second data set, wherein generating the third data flow graph comprises:

removing, based on determining that the first direct relationship, the third direct relationship, and the fourth direct relationship from the second data flow graph are in the set of intermediate direct relationships connecting the first data set to the second data set, the first direct relationship, the third direct relationship, and the fourth direct relationship from the second data flow graph; and storing, by the processor, the third data flow graph in a database, wherein the third data flow graph is accessible in the database via a database query.

20. The one or more non-transitory computer-readable media of claim 19, the operations further comprising:

determining, by the processor, that the first data flow graph represents a sixth direct relationship between a third data element of the first data set and a seventh direct relationship between the first data element and the second data set;

determining, by the processor, the second data flow graph by replacing the seventh direct relationship with: (i) an eighth direct relationship between the third data element and a fourth data element of the second data set that is determined based on the third data element, and (ii) a ninth direct relationship between the fourth data element and the second data set; and determining, by the processor, the third data flow graph by removing the sixth direct relationship, the eighth direct relationship, and the ninth direct relationship.

* * * * *